(12) United States Patent
Harrison et al.

(10) Patent No.: US 6,439,776 B1
(45) Date of Patent: Aug. 27, 2002

(54) FIBER OPTIC LOOP SUPPORT

(76) Inventors: Joseph C. Harrison, 122 Deerlake Dr., Asheville, NC (US) 28803; Andrew T. Piatek, 102 Rumbough Pl., Asheville, NC (US) 28806

( * ) Notice: Subject to any disclaimer, the term of this patent is extended or adjusted under 35 U.S.C. 154(b) by 0 days.

(21) Appl. No.: 09/570,801

(22) Filed: May 15, 2000

(51) Int. Cl.⁷ ................................................ G02B 6/36
(52) U.S. Cl. ............................ 385/53; 385/66; 385/137
(58) Field of Search ........................... 385/53, 66, 134, 385/136, 137

(56) References Cited

U.S. PATENT DOCUMENTS

| | | | | |
|---|---|---|---|---|
| 4,952,798 A | * | 8/1990 | Graham et al. | 250/227.11 |
| 4,979,793 A | * | 12/1990 | Bowen et al. | 350/96.2 |
| 5,196,899 A | * | 3/1993 | Serwatka | 356/73.1 |
| 5,367,159 A | * | 11/1994 | Schofield et al. | 250/227 |
| 6,149,313 A | * | 11/2000 | Giebel et al. | 385/59 |
| 6,215,943 B1 | * | 4/2001 | Crotts et al. | 385/137 |

* cited by examiner

*Primary Examiner*—Akm E. Ullah
*Assistant Examiner*—Jennifer Doan
(74) *Attorney, Agent, or Firm*—Coats & Bennett, P.L.L.C.

(57) ABSTRACT

A testing device for fiber optic system devices includes a fiber optic loop support that holds a single-mode optical fiber such that an empirically determined loss characteristic associated therewith is unvarying from use to use. In particular, an optical fiber forms a loop, and the loop is supported within a rigid slotted housing. The housing effectively precludes bending losses. Additionally, the housing is small and portable so that field testing may also be performed.

20 Claims, 4 Drawing Sheets

FIBER OPTIC LOOP SUPPORT

FIELD OF THE INVENTION

The present invention relates to a device that supports a loop of optical fiber such that the loop may be used to test fiber optic-related equipment.

BACKGROUND OF THE INVENTION

Optical fibers were introduced in the early 1970s. Since that time, their use has expanded into numerous settings. Additionally, a number of different forms of optical fibers have appeared. The principle division is between single-mode fibers and multi-mode fibers, with multi-mode fibers being further divided into graded index multi-mode and step-index multi-mode fibers. As understood in the fiber optic industry, a "mode" is a transverse pattern of energy propagating at a specific velocity through the fiber.

Multi-mode fibers, as the name suggests, support a number of modes. Multi-mode fibers offer the advantages of being able to be coupled to incoherent light sources and having a wider tolerance for alignment with these light sources. Multi-mode fibers may be connected and spliced one to another with a fair amount of latitude. Additionally, multi-mode fibers are generally forgiving when it comes to losses induced by bends in the fiber. That is, the fiber may bend fairly substantially without worry about losses induced by the bend. Two disadvantages of multi-mode fibers are intermodal dispersion wherein different modes may travel at different velocities and relatively high attenuation.

Single mode fibers, in contrast, only support a single mode, namely the $HE_{11}$ mode. Single-mode fibers do not suffer from internodal dispersion, are generally considered to have higher bandwidth capabilities than multi-mode fibers, and are relatively insensitive to losses induced by local lateral microdisplacements of the fiber from a mean axis (microbending—bends on the order of the size of the core of the fiber). However, single-mode fibers are more susceptible to losses generated by macroscopic bending. As the radius of curvature decreases, losses within the fiber increase. Further, greater care when splicing single-mode fibers is required.

Those who use fibers are greatly concerned with losses because loss dictates how far a signal will propagate within the fiber and still be usable. While amplifiers may counteract losses, each amplifier in a system increases costs and requires additional connective infrastructure. Knowledge of a loss profile of a fiber is extremely helpful when designing fiber based systems so that appropriate hardware or signal processing is used to compensate for the known losses.

In 1998, SIECOR introduced a duplex connector to replace the traditional SC type connector. This new connector, known as the MT-RJ, is approximately the size of a phone plug, allowing connector density within fiber systems to double effectively over the old SC type connectors and achieve densities equal to, or in some cases better than, copper-based systems. The MT-RJ has rapidly become the industry standard for fiber optic systems. An additional feature of the MT-RJ connector is its ability to be used with both single-mode and multi-mode fibers.

As a result of the rapid acceptance of the MT-RJ, new devices within fiber optic systems are now being equipped with MT-RJ female receptacles to mate with the male end of the MT-RJ. Manufacturers of such devices include CISCO, 3COM, and others within the telecommunications industry. Examples of such devices include Optical Time Domain Reflectometers (OTDRs), routers, optical transceivers, optical amplifiers, and the like. Specific examples include the CATALYST 8500 family of non-blocking multiservice switch routers from CISCO, the CFX-1433M 100Mbps Fast Ethernet Hub from Canary Communications, and 12RJ-3200A HP ADVANCESTACK 10base-T Hubs. However, these devices must frequently be tested to see if they are functioning properly. This is especially important before shipping to a consumer, as the companies producing these devices do not want to ship defective products. Additionally, it may be desirable to test these devices after installation to verify that they are not the source of system failure.

SIECOR has introduced a device coupled to an MT-RJ connector that allows testing of system devices using multi-mode fibers. However, this device has a flexible fiber element and is inappropriate for use with a single-mode fiber. In particular, this device is especially susceptible to drooping as a result of temperature increases. This droop induced bending is acceptable in a multi-mode fiber, but not for a comparable single-mode fiber. As a result, there is still a need for a device that utilizes a single-mode fiber to test the functionality of fiber optic system devices.

SUMMARY OF THE INVENTION

The shortcomings of the prior art are addressed by providing a rigid support that holds a single-mode fiber in a position with a relatively constant or repeatable loss profile and further is adapted to connect to an MT-RJ connector. An exemplary embodiment of the present invention comprises a generally planar, rigid, plastic housing. The housing may be approximately three and a half (3.625) inches long and have a slotted first end. The slot gives access to a cavity extending substantially the length of the housing, in effect forming a sleeve. The slot includes an arcuate center area sized to accommodate the standard protuberance on the end of a standard MT-RJ connector. In use, a single-mode fiber or filament is secured to the MT-RJ and then slipped into the slot. The protuberance on the MT-RJ may be secured to the housing to form the testing device. In essence, the support acts like a sleeve positioned over the filament that is secured to the MT-RJ. The loss characteristics of the testing device may then be determined empirically, and the testing device labeled with appropriate indicia indicative of the empirically determined loss characteristic. Subsequently, the testing device may be used repeatedly to verify the functionality of other fiber optic system devices. The housing holds the filament loop such that the loss characteristic of the loop does not change between uses and likewise is not susceptible to bending such as may occur in the SIECOR multi-mode testing unit.

DETAILED DESCRIPTION OF THE PREFERRED EMBODIMENTS

Figure 1:
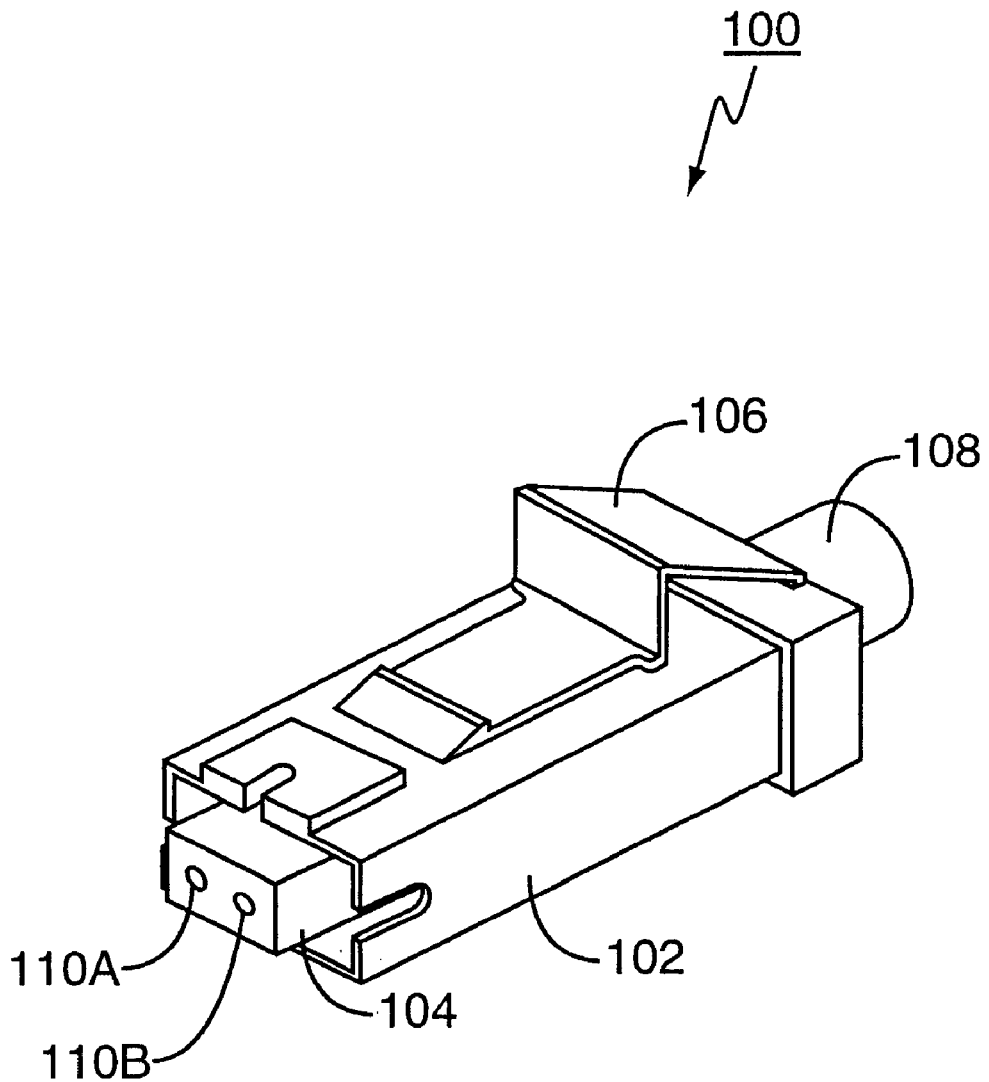
FIG. 1 is a perspective view of a prior art MT-RJ connector.

A typical MT-RJ connector 100 is shown in FIG. 1. MT-RJ connector 100 includes a body 102 having a springmounted fiber interface 104 contained therein. A biased clip 106 allows the MT-RJ 100 to be secured in a conventional receptacle or fiber optic system device (neither shown). A protuberance 108 provides a connective surface for a fiber or filament (the terms are used interchangeably herein) to be connected to the MT-RJ 100. In particular, most fibers are covered by at least two protective coatings. A strain relief (not shown) is secured to the protective coating and to the protuberance. The fiber interface 104 includes duplex fiber orifices 110A and 110B. It should be appreciated that the MT-RJ 100 is approximately the size of a conventional phone plug and, thus, is highly desirable in the fiber optic industry to improve density over the old SC connectors. MT-RJ 100 may be used with both single-mode and multi-mode fibers. In practice, optical fibers are secured at a first end to the fiber interface 104, with the second end extending through the protuberance 108. Light is then transmitted and received through orifices 110A and 110B. For example, light may be transmitted through orifice 110A, down a filament to a remote transceiver that replies with a light signal transmitted through a second filament and received through orifice 110B by the original transceiver. Thus, the two orifices 110A and 110B allow for duplex communications.

Figure 2:
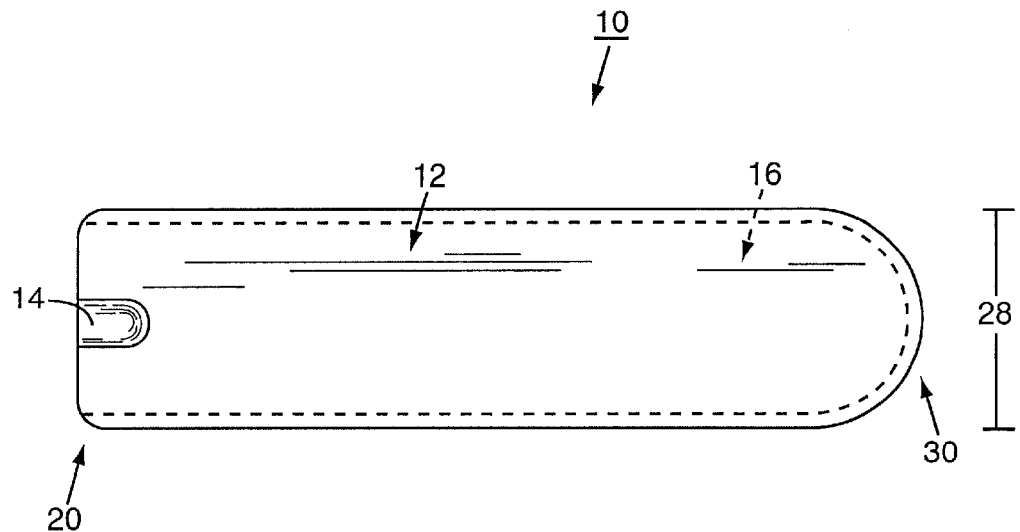
FIG. 2 is a top plan view of the fiber optic loop support of the present invention.
Figure 3:
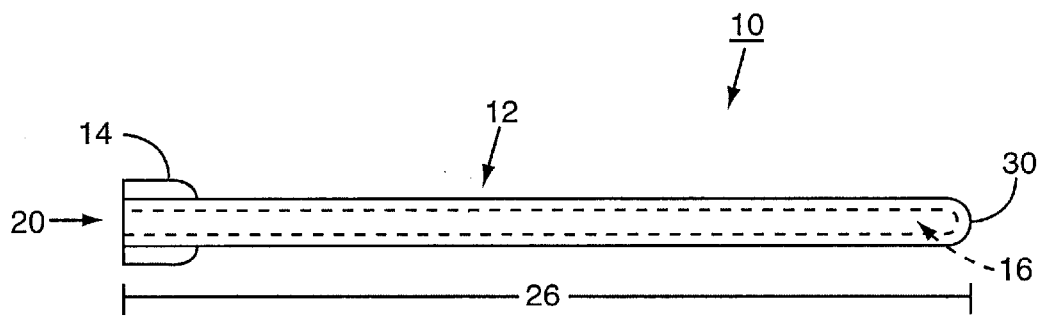
FIG. 3 is a side elevational view of the support of FIG. 2.
Figure 4:
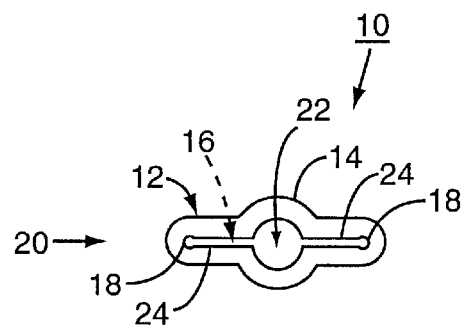
FIG. 4 is a front elevational view of the support of FIG. 2.

As noted, single-mode fibers are especially susceptible to losses induced by macroscopic bending. Thus, if a testing device is to be created for a single-mode fiber, that device must be able to support the single-mode fiber such that the loss profile of the fiber remains relatively constant between uses. While loss is acceptable, a fiber with a variable loss is not acceptable. To this end, a fiber optic loop support 10 is illustrated in FIGS. 2–4. Specifically, the fiber optic loop support 10 includes a substantially rigid body 12, preferably made out of a durable plastic. At a first end 20 of the elongated body 12, a protuberance receptacle 14 is positioned. Protuberance receptacle 14 includes an aperture 22 (FIG. 4) which is sized appropriately to receive the protuberance 108 of an MT-RJ 100. On either side of the aperture 22, a slot aperture 24 is located. On the terminal ends of slot aperture 24 are rounded end points 18. Note that rounded end points 18 are purely optional, and the housing may include squared off endpoints that may be easier to be manufactured in a molding process. Slot aperture 24 and aperture 22 open into cavity 16 that extends substantially the length of the body 12. As a further optional feature, the body 12 may include a through hole (not shown) near second end 30.

In an exemplary embodiment, the body 12 is approximately three and a half inches (3.625) long, as indicated by length 26, and approximately one-half inch (0.683) wide, as indicated by width 28. Second end 30 has a vertical radius of approximately 1/32 inch (FIG. 3). Slot aperture 24 has a vertical height of approximately 0.045 inch and rounded end points 18 have a radius of approximately 0.04 inch. The walls of the housing may be approximately 0.062 inch thick when made from a plastic material such as PVC, ABS, polycarbonate, or the like. These dimensions are for illustrative purposes only and are not intended to be limiting; however, dimensions such as those recited do provide adequate size and space for the present invention to be practiced. At a very minimum, the slot height should be sufficiently large to insert a 250 micron optical fiber therein.

It should be appreciated that fiber optic supports other than that described are also contemplated. Size, shape, material, and the like may be varied. Since the purpose of the support is to prevent unanticipated losses, the support should keep the optical fiber positioned such that the loss profile associated with the fiber is relatively uniform from use to use. Note further that the present invention could also be used with a multi-mode fiber if desired.

Figure 5:
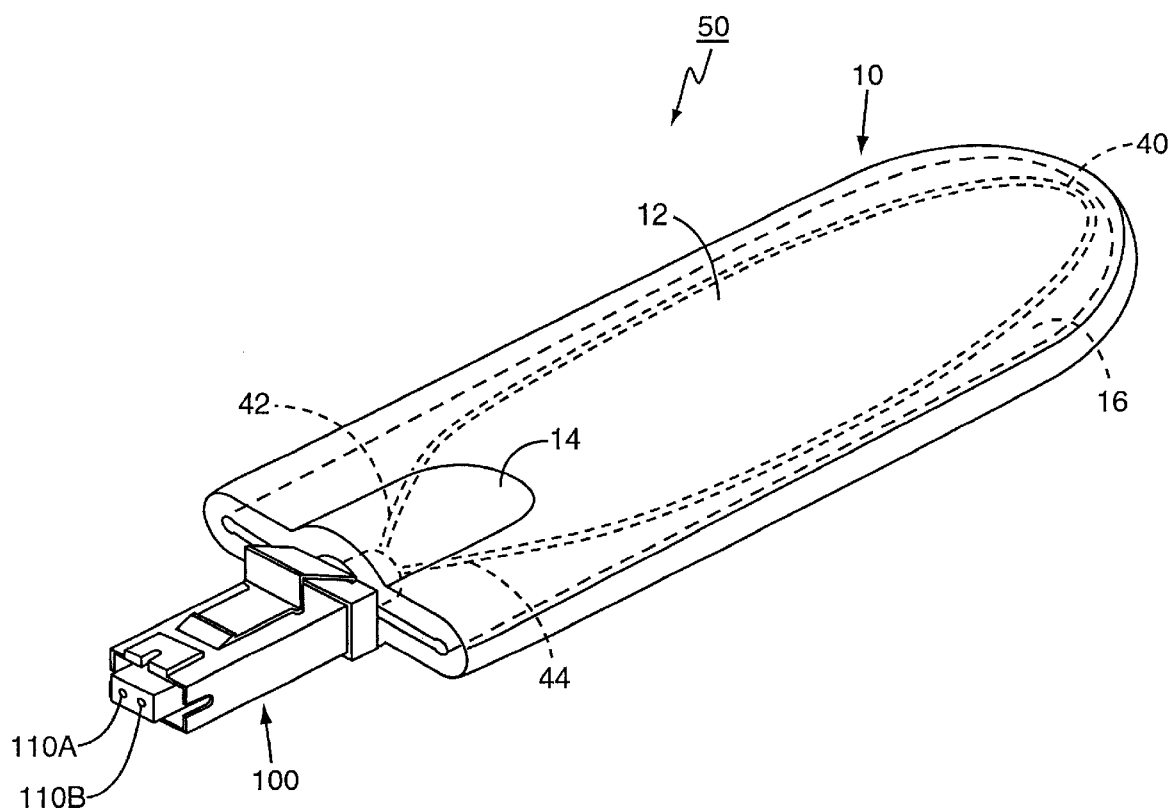
FIG. 5 is a perspective view of the support coupled to the connector to form a testing device.

A completed testing device 50 is shown in FIG. 5 comprising a loop support 10 and an MT-RJ 100, coupled with a single-mode optical fiber 40. The single-mode fiber 40 is secured to the MT-RJ 100 in a looped fashion with a first end 42 operating through orifice 110A and a second end 44 operating through orifice 110B. The looped portion of the fiber 40 extends from the interface 104, out through the protuberance 108. After securing the fiber 40 to the MT-RJ 100, the fiber 40 is placed within the cavity 16, such as by simple insertion, and allowed to rest therein. The protuberance 108 may be pressure fit within aperture 22 but may, alternatively, be secured through a conventional adhesive or other fastener. While the loop of fiber 40 is shown in one configuration, it should be appreciated that the actual configuration may be almost any shape within the cavity 16.

Figure 6:
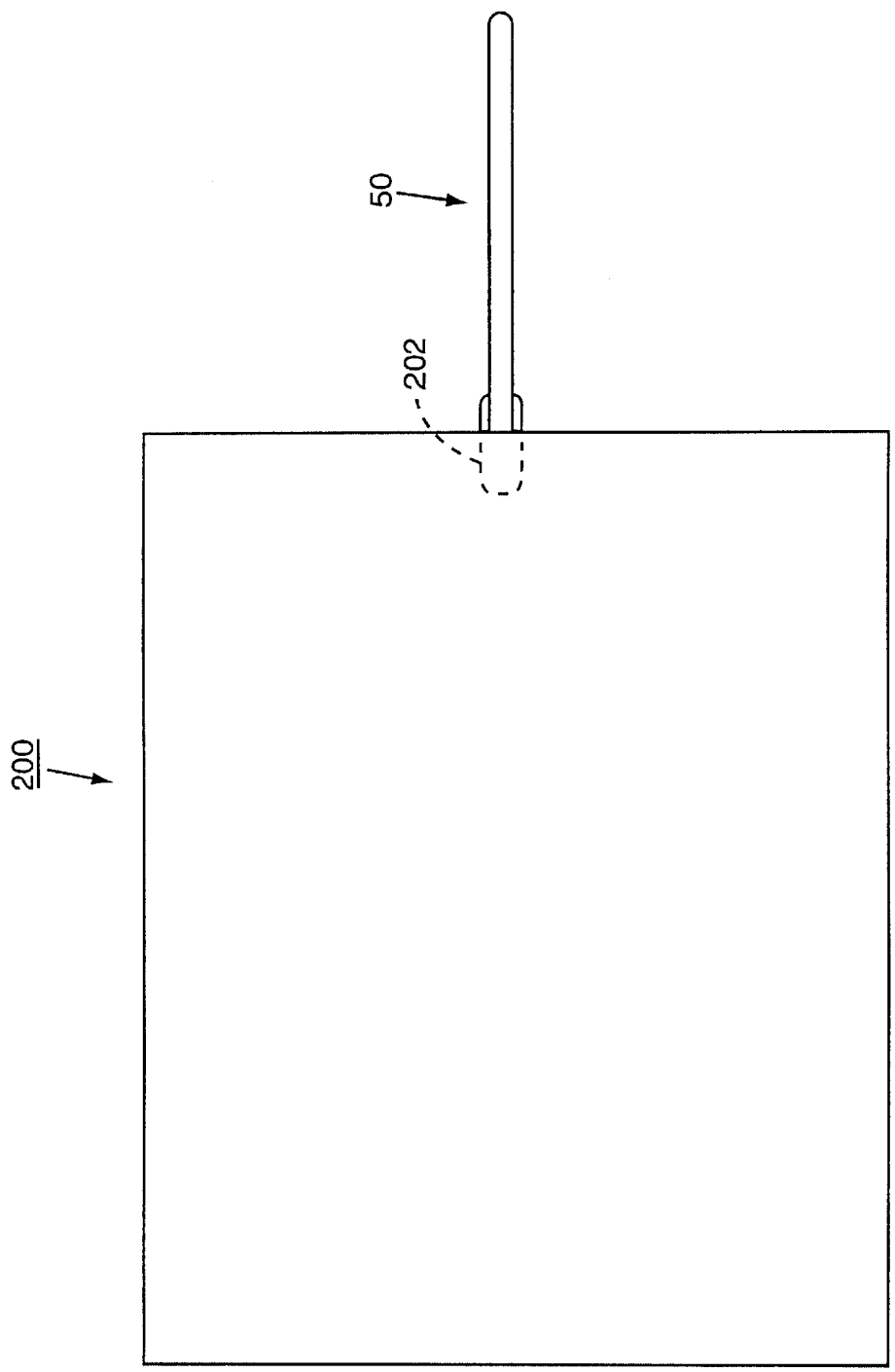
FIG. 6 is a simplified version of the testing device in use to test a fiber optic system device.

In use, a loss characteristic of the testing device 50 is empirically determined after assembly. Appropriate indicia may be placed on the testing device 50 on a planar surface or with the accompanying literature. For example, the testing device could be labeled "1 dB loss" if in fact the testing device 50 had a 1 dB loss. In use, the MT-RJ 100 end of the testing device is inserted like a conventional connector into a female receptacle 202 on the device 200 (FIG. 6). Thus, when the testing device 50 is used to determine whether the piece of equipment 200 is working properly, a known signal may be transmitted from device 200 through the loop of fiber 40 and back to the device 200. The output received through orifice 110B may then be compared to the original transmitted waveform. The output is compensated for the known loss characteristics of the testing device 50 and, if the waveforms match, the device 200 is working properly.

Testing device 50 may be used repeatedly, such as on an assembly line to verify that each device 200 produced is functioning properly. The, loss characteristic of testing device 50 does not change significantly from test to test, allowing quick and easy verification of the operability of the device 200. Further, the testing device 50 is small, light weight, and easily portable, allowing for field use as well. During installation;of fiber optic system components in the field, the testing device 50 may be used to verify operability of the device 200 after shipping and handling. Additionally, the ease of use of the MT-RJ connector 100 used with the testing device 50 means that even in installed systems, the testing device 50 may be used to help isolate failures.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A testing device for use with a device, said testing device comprising:
    a connector;
    an optical fiber comprising two ends, said both ends operatively secured to said connector; and
    a rigid support for holding said fiber such that losses induced in said fiber are substantially nonvarying from use -to use of the testing device.

2. The testing device of claim 1 wherein said connector is an MT-RJ connector.

3. The testing device of claim 1 wherein said fiber is a single-mode optical fiber.

4. The testing device of claim 1 wherein said support comprises a slotted housing having an interior cavity and said fiber is positioned therewithin.

5. The testing device of claim 4 wherein said housing includes a first end including a protuberance receptacle thereon.

6. The testing device of claim 5 wherein said connector is an MT-RJ and said protuberance receptacle is adapted to receive a protuberance on said MT-RJ.

7. The testing device of claim 1 wherein said optical fiber loops from said connector back to said connector in a continuous fashion.

8. A fiber optic loop support comprising:
   a rigid housing;
   a connector receptacle positioned on said housing and adapted to receive a single optical connector attached to both ends of an optical fiber; and
   said housing comprising a surface adapted to receive an optical fiber positioned thereon such that losses induced in said fiber are substantially nonvarying between uses of said fiber.

9. The fiber optic loop support of claim 8 further including a single-mode optical fiber positioned on said surface.

10. The fiber optic loop support of claim 9 wherein said housing includes an interior chamber and said fiber is positioned within said interior chamber.

11. The fiber optic loop support of claim 8 wherein said connector receptacle is adapted to receive an MT-RJ connector.

12. The fiber optic loop support of claim 11 wherein said connector receptacle comprises a rounded portion on one end of said housing, said rounded portion having an aperture therein.

13. The fiber optic loop support of claim 8 wherein said housing is generally planar.

14. A method of testing a fiber optic system device, comprising:
   inserting a connector attached to a fiber optic loop support containing a loop of optical fiber into the fiber optic system device, wherein the connector is operatively connected to both ends of said loop; and
   maintaining the loop substantially free of later introduced bends such that the loss characteristic of the loop is substantially constant.

15. The method of claim 14 wherein inserting a connector comprises inserting an MT-RJ connector.

16. The method of claim 14 further comprising removing the connector from the fiber optic system device.

17. The method of claim 16 further comprising subsequently inserting the connector into a second fiber optic system device.

18. The method of claim 17 wherein the loss characteristic of the loop remains substantially constant for both insertions.

19. A method of manufacturing a fiber optic testing device, comprising:
   attaching both ends of an optical fiber to a connector;
   inserting the fiber into a loop support such that the fiber has a relatively constant loss characteristic; and
   securing the connector to the loop support.

20. A fiber optic loop support comprising:
   a rigid housing;
   means to receive a single connector attached to both ends of an optical fiber, said receiving means positioned on said rigid housing; and
   means to hold said optical fiber such that losses induced in the fiber are substantially nonvarying, said holding means integrated with said rigid housing.

* * * * *